(12) United States Patent
Erdtmann et al.

(10) Patent No.: US 9,340,365 B2
(45) Date of Patent: May 17, 2016

(54) CONSTRUCTION MACHINE WITH HEATABLE BEARING STRUCTURES

(71) Applicant: JOSEPH VOEGELE AG, Ludwigshafen/Rhein (DE)

(72) Inventors: Bernhard Erdtmann, Mannheim (DE); Wolfgang Mueller, Reichelsheim (DE); Andre Felchner, Bockenem (DE)

(73) Assignee: JOSEPH VOEGELE AG (DE)

( * ) Notice: Subject to any disclaimer, the term of this patent is extended or adjusted under 35 U.S.C. 154(b) by 0 days.

(21) Appl. No.: 14/265,803

(22) Filed: Apr. 30, 2014

(65) Prior Publication Data
US 2015/0008094 A1    Jan. 8, 2015

(30) Foreign Application Priority Data
Jul. 5, 2013   (EP) .................................... 13175298

(51) Int. Cl.
*E01C 19/02* (2006.01)
*B65G 41/00* (2006.01)
*E01C 19/48* (2006.01)
*B65G 33/00* (2006.01)

(52) U.S. Cl.
CPC .............. *B65G 41/008* (2013.01); *B65G 33/00* (2013.01); *E01C 19/48* (2013.01); *E01C 2301/10* (2013.01)

(58) Field of Classification Search
CPC ........................... E01C 19/104; B65G 41/006
USPC ............... 198/300, 311, 625; 404/92, 95, 113
See application file for complete search history.

(56) References Cited

U.S. PATENT DOCUMENTS

| 3,367,913 | A | | 2/1968 | Intorre et al. |
| 3,820,914 | A | * | 6/1974 | Zimmerman ................. 404/110 |
| 3,967,913 | A | | 7/1976 | Gabriel, Jr. |
| 4,072,435 | A | * | 2/1978 | Coho et al. .................... 404/110 |
| 4,215,949 | A | * | 8/1980 | Gabriel, Jr. .................... 404/110 |
| 4,676,689 | A | * | 6/1987 | Yant .............................. 404/110 |
| 4,704,046 | A | * | 11/1987 | Yant .............................. 404/109 |

(Continued)

FOREIGN PATENT DOCUMENTS

| CN | 201228339 Y | 4/2009 |
| CN | 102322013 A | 1/2012 |

(Continued)

OTHER PUBLICATIONS

Japanese Office Action Dated Nov. 4, 2014, Application No. 2014-091420, Dispatch No. 569308, 2 Pages.

(Continued)

*Primary Examiner* — Douglas Hess
(74) *Attorney, Agent, or Firm* — Brooks Kushman P.C.

(57) ABSTRACT

A construction machine, according to the disclosure, for the processing and/or transport of material having a temperature-dependent viscosity is configured as a road finisher or a feeder. The construction machine comprises a machine frame on which a material bunker, an operator's platform, a primary drive as well as an undercarriage with propulsion elements are provided. The construction machine furthermore comprises a conveyor system which is configured to convey the material, wherein the conveyor system comprises at least one screw conveyor, and the at least one screw conveyor is supported by at least one bearing structure. The construction machine is characterized in that the at least one bearing structure can be heated by at least one heating element.

22 Claims, 6 Drawing Sheets

(56) References Cited

U.S. PATENT DOCUMENTS

| | | | | |
|---|---|---|---|---|
| 5,131,788 | A * | 7/1992 | Hulicsko | 404/108 |
| 5,333,969 | A * | 8/1994 | Blaha et al. | 404/91 |
| 5,615,973 | A * | 4/1997 | Campbell | 404/75 |
| 7,458,746 | B1 * | 12/2008 | Zimmerman | 404/101 |
| 8,556,536 | B2 * | 10/2013 | Giles | 404/93 |
| 8,931,975 | B2 * | 1/2015 | Warlow et al. | 404/92 |
| 2013/0051961 | A1 | 2/2013 | Diesner et al. | |

FOREIGN PATENT DOCUMENTS

| | | |
|---|---|---|
| DE | 7127605 U | 12/1971 |
| DE | 2140058 A1 | 2/1973 |
| DE | 2219569 A1 | 10/1973 |
| DE | 2248412 A1 | 4/1974 |
| DE | 2312188 A1 | 9/1974 |
| DE | 19809435 A1 | 5/1999 |
| DE | 202010005125 U1 | 7/2010 |
| GB | 256618 A | 11/1927 |
| JP | 11247127 A | 9/1999 |
| SU | 565972 A1 | 7/1977 |

OTHER PUBLICATIONS

Extended European Search Report Dated Dec. 11, 2013, Application No. 13175298.2-1604, Applicant Joseph Vöegele AG, 4 Pages.

Chinese Office Action and Search Report Dated Dec. 31, 2015, Application No. 201410204328.5, 8 pages.

* cited by examiner

CONSTRUCTION MACHINE WITH HEATABLE BEARING STRUCTURES

CROSS-REFERENCE TO RELATED APPLICATIONS

This application claims foreign priority benefits under 35 U.S.C. §119(a)-(d) to European patent application number EP 13 175 298.2, filed Jul. 5, 2013, which is incorporated by reference in its entirety.

TECHNICAL FIELD

The disclosure relates to a construction machine.

BACKGROUND

In practice, construction machines of this type, for the processing and/or transport of mixed materials having a temperature-dependent viscosity, e.g., asphalt, are known in the form of road finishers or feeders. They are used in road building for the laying of layers, or for the building of other paved trails. They process material which is still hot, and the material is distributed and compacted on the surface to be paved. The temperature of the paving material and a homogeneous temperature distribution inside the paving material plays a decisive role for the quality of the paving result. The prior art described below discloses different means and methods to keep the temperature of the material on a desired level at different places of the construction machine and to keep the temperature distribution homogeneous, respectively.

Documents DE 2 140 058 A and DE 7 127 605 U, which are both in the name of the applicant, each disclose a scraper plate which is provided for guiding the material in the area of the lateral distribution screw. This plate is configured to be heatable.

DE 2 312 188 A discloses a mastic asphalt road finisher which includes heatable screw conveyors that transport the material from a front side to a rear side of the road finisher. These screw conveyors are surrounded by heatable troughs.

Other heatable material conveyor systems in road finishers and material conveyor system including heating devices are known from DE 20 2010 005 125 U1 in the name of the applicant, and from DE 198 09 435 A1. DE 2 219 569 A shows a road finisher that comprises screw conveyors which are arranged in heatable tubes.

SUMMARY

It is an object of the disclosure to improve construction machines of the above-mentioned type such that a more homogeneous temperature distribution in the paving material is achieved.

A construction machine according to the disclosure for the processing and/or transport of material having a temperature-dependent viscosity is a road finisher or a feeder. Same comprises a machine frame on which a material bunker, an operator's platform, a primary drive as well as an undercarriage with propulsion elements are provided. The construction machine according to the disclosure further comprises a conveyor system which is configured to convey the material, wherein the conveyor system comprises at least one screw conveyor, and the at least one screw conveyor is supported by at least one bearing structure. The construction machine according to the disclosure is characterized in that the bearing structure itself can be heated by at least one heating element. The bearing structure is configured to rotatably support the screw conveyor on the machine frame. Preferably, the bearing structure is configured to rotatably support the screw conveyor on its central axis or rotation axis. This may be realized by means of suitable bearing sections which are provided at the screw conveyor, for example, on a core shaft of the screw conveyor. Particularly preferred is the use of pivot bearings, e.g., antifriction bearings or friction bearings, respectively, slide bushes. Same are capable of reducing the friction and, thus, the wear. The bearing structure is, for example, a bearing pedestal on which the screw conveyor is rotatably mounted in the area of its rotation axis.

The construction machine according to the disclosure has the advantage that the temperature level and the homogeneity of the temperature distribution are not negatively influenced even in those cases in which the paving material comes into contact with the bearing structure. Such a possibility of heating the bearing structure moreover has the advantage that cooled, possibly sticking material can be heated and removed more easily when the construction machine is cleaned. In addition, the configuration according to the disclosure allows a kind of preheating the bearing structure before the operation of the screw conveyors is started. Thus, remaining cooled material which counteracts the rotation of the screw conveyors by sticking to the bearing structure is softened, thus reducing the starting torque of the screw conveyors. The reduced friction due to less cool and thus solid material residues also reduces wear.

It is conceivable that the heating element is integrated into the bearing structure. For example, it may be formed integrally with the bearing structure. It is conceivable, for example, that the heating element is encapsulated in the bearing structure. In this case, the heating element may either be exposed to the outside or covered by the bearing structure.

In one variant the heating element may be arranged in a hollow space present inside the bearing structure. This arrangement has the advantage that the bearing structure protects the heating element from damages, dust, moisture or other negative influencing factors. In this case, it is possible that the hollow space is already present in the bearing structure, for example, because the bearing structure is made from a tubular or other hollow semi-finished product. Also, it is possible that the hollow space is specifically provided for receiving the heating element.

In another advantageous variant the heating element may be provided on an outside of the bearing structure. This has the advantage that a possibly defective heating element is easier to replace. In general, it is easier to carry out maintenance and repair works on a heating element that is mounted outside the bearing structure. For this purpose, it may be an advantage if the heating element is fixed to the outside of the bearing structure by a detachable connection. This connection can be, for example, a screwed connection, a form-closed connection or a plug connection. Also, it is possible to provide a permanent connection, e.g., a material-closed connection, a welded connection or an adhesive connection.

It is particularly favorable if a protective element is provided for protecting the heating element. Same can be fixed, for example, to the bearing structure, preferably in a removable manner. Thus, it is possible to protect a heating element exposed to the outside of the bearing structure or arranged on this outside, respectively, at least from mechanical influences such as impacts or strokes, or from sticking to the paving material. A removable embodiment of the protective element furthermore allows an easy performance of maintenance, repair and replacement works. The protective element may, in this case, be directly fixed by a detachable connection. It is also conceivable, however, to permanently attach a mounting element to which the protective element is fixed in a removable manner. In this case, the protective element may be fixed to the bearing structure itself or just as well to any other suitable structure of the construction machine, e.g., to the machine frame.

The bearing structure may be, for example, a central bearing pedestal and/or outer bearing pedestal of the screw conveyor. The screw conveyor may be, for example, a cross-feed auger distributing the paving material transversely relative to the driving direction in front of a screed of a road finisher. The center bearing pedestal is provided in the center of the road finisher. The outer bearing pedestal may be arranged on the left or on the right outside at the end of the screw conveyor. Both the center and the outer bearing pedestals are configured to support the screw conveyor rotatably on the machine frame.

It is conceivable that several bearing structures having each at least one heating element are provided, wherein at least one heating element is arranged inside the bearing structure at which it is provided and/or at least one heating element is arranged on an outside of the bearing structure at which it is provided. Thus, any combinations of heating elements provided within the respective bearing structure and on an outside of the respective bearing structure are possible. In an example including a central bearing structure and two outer bearing structures, for example, the heating elements may be provided on the outer bearing structures, on the outside of the respective outer bearing structures, and the heating elements on the central bearing structure may be provided inside the bearing structure. However, any other suitable combinations are conceivable as well.

In one embodiment all heating elements may be arranged inside the respective bearing structures, or all heating elements may be arranged on an outside of the respective bearing structures.

It is particularly favorable if the heating capacity of the heating element is variably adjustable. Thus, it is possible to adjust the heating capacity to different paving materials each of which have different processing temperatures. Also, an adjustment to fluctuating ambient temperatures is possible. In addition, it is conceivable that different processing speeds require different temperatures.

In another advantageous embodiment the heating capacity of the heating element may be automatically controllable. This significantly increases the operating comfort of the construction machine according to the disclosure.

Several input variables are conceivable as the basis for controlling the heating capacity of the heating element. In an advantageous embodiment the control is based on a desired temperature value. It is also possible, however, to use a predefined heat quantity. Irrespective of the desired values used for the controlling said values may be dependent on other influencing factors, e.g., the ambient temperature, the temperature of the mixed material, the heat conductivity of the used materials for the bearing, the paving speed or the working width of a screed if the construction machine according to the disclosure is a road finisher.

It is advantageous if the heating element can be operated independently of other aggregates of the construction machine. It is conceivable that the heating element can be operated independently of all aggregates of the construction machine. These aggregates may be, for example, a primary drive of the construction machine, the conveyor system of the construction machine, a cooling system and any other components of the construction machine. Also, the heating element can be operated independently of selected aggregates of the construction machine, for example, independently only of the conveyor system, but dependently on the primary drive of the construction machine. Thus, different functions are easier to realize, e.g., the cleaning or preheating functions mentioned above.

It is conceivable that the heating elements are encapsulated in a kind of matrix material. In this case, metals, ceramics, glass, carbon fiber or plastic materials may be used. Suitable combinations or composite materials of these materials are possible as well.

It is conceivable that the heating element can be operated using electric energy. Such electrical heating elements are already commonly used, for example in road finishers, at other installation sites. The heating capacity thereof is easy to adjust, and the connection thereof may be accomplished by simple cables.

If electrical heating elements are used different modes of action are conceivable. It is possible, for example, that the heating element comprises a resistance heating element, an inductive heating element or an infrared radiator. The different types of electrical heating elements have different advantages. For example, a resistance heating element is particularly easy to realize, while an infrared radiator allows a directional heat transfer.

In another variant other heating elements are conceivable, e.g., heating elements operated by the combustion of a fuel.

In this case, a plurality of fuels comes into consideration, for example, different combustion gases, such as methane, acetylene, propane, butane or hydrogen. Also, liquid fuels are usable, e.g., petrol or diesel. The fuel may be both a fuel carried along specifically for the purpose of operating the at least one heating element and the same fuel as used for operating the primary drive. In other words, the fuel may be usable both for operating the heating element and for operating the primary drive.

In another variant the heating elements may comprise hot air blowers which can be operated, for example, by heated cooling air of the primary drive or exhaust gases of same.

It is particularly favorable if the heating element includes a cleaning mode in which the heating element is operated to soften hardened material in the bearing structure area and, thus, enable an easier cleaning Such a cleaning mode may, for example, consist in the heating element supplying the highest possible heating capacity for a certain period.

It may be advantageous if the heating element can be adjusted from an operating device provided on the construction machine. This operating device may be, for example, a centralized operating console in the area of the operator's platform. For example, so-called external control stations are conceivable, too, which are fixed, for example, to the outer ends of a paving screed of a road finisher. In this case, a direct variable adjustment of the heating capacity of the heating element is conceivable. In another variant the desired temperature value for an automated control may be predefined by an operator using the operating device.

An advantageous exemplary embodiment according to the disclosure will be explained in more detail below by means of the following drawings.

DETAILED DESCRIPTION

As required, detailed embodiments are disclosed herein; however, it is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
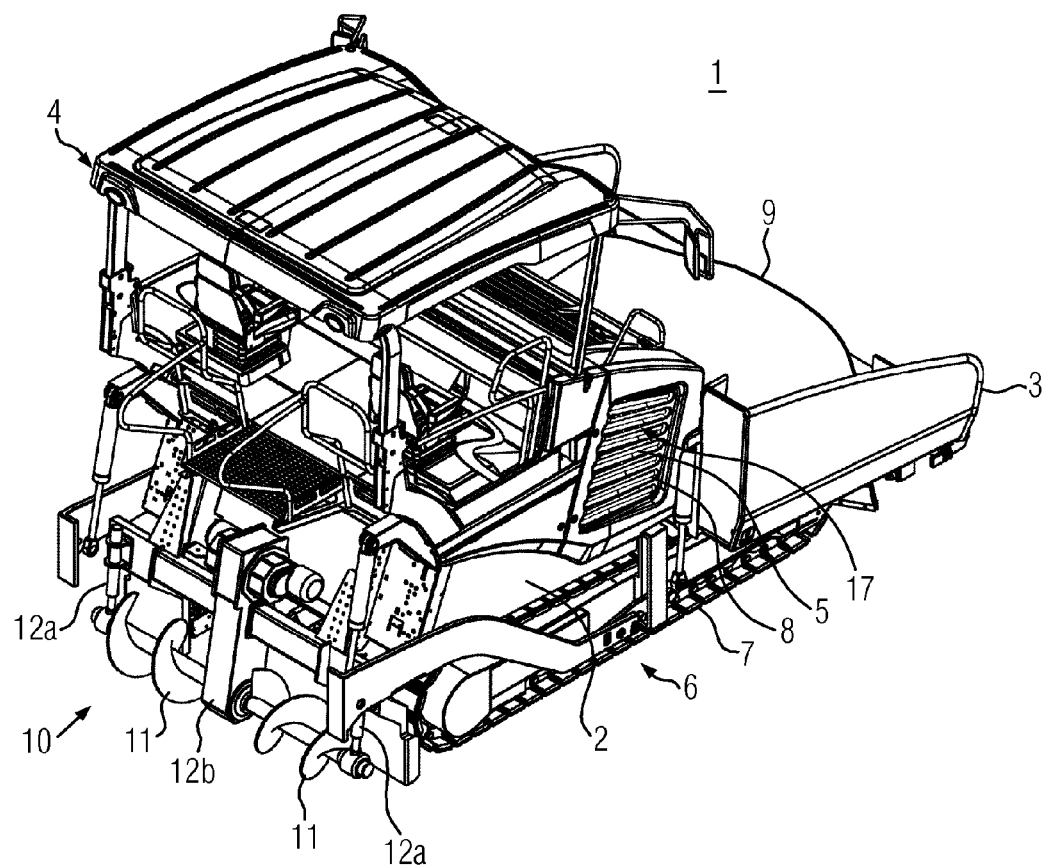
FIG. 1 shows a perspective rear view of a construction machine, in this example a road finisher, wherein, for the sake of clearness, no mounted screed is shown.

FIG. 1 shows a construction machine 1, in this case a road finisher, which comprises a machine frame 2. A material bunker 3, an operator's platform 4, a primary drive 5 and an undercarriage 6 with propulsion elements 7 are provided on the machine frame 2. The primary drive 5 is provided at least for driving the undercarriage 6. It may also provide for a suited form of energy for other aggregates of the construction machine 1, e.g., hydraulic pressure for hydraulically driven systems, or electric voltage for electrically operated systems. The primary drive 5 is accommodated in a machine housing behind ventilation slots 8 which are configured to supply fresh air for a cooling system 17 (which is likewise arranged in a machine room behind the ventilation slots 8).

The material bunker 3 serves to receive a stock of material 9 from which the subsequent pavement is made. To this end, the material 9 is conveyed through a longitudinal conveying system (not shown) underneath the operator's platform 4 to the rear side of the construction machine 1, where it is distributed by a conveyor system 10 transversely relative to the driving direction of the construction machine 1. In the embodiment shown the conveyor system 10 includes two screw conveyors 11. These screw conveyors 11 are rotatably mounted on the machine frame 2 through bearing structures 12 and, where applicable, other structural elements 13. In the embodiment shown two outer bearing pedestals 12a and one center bearing pedestal 12b are used as bearing structures. According to the disclosure, depending on the configuration of the conveyor system 10, different numbers and types of bearing structures 12 may be used, however.

Figure 2:
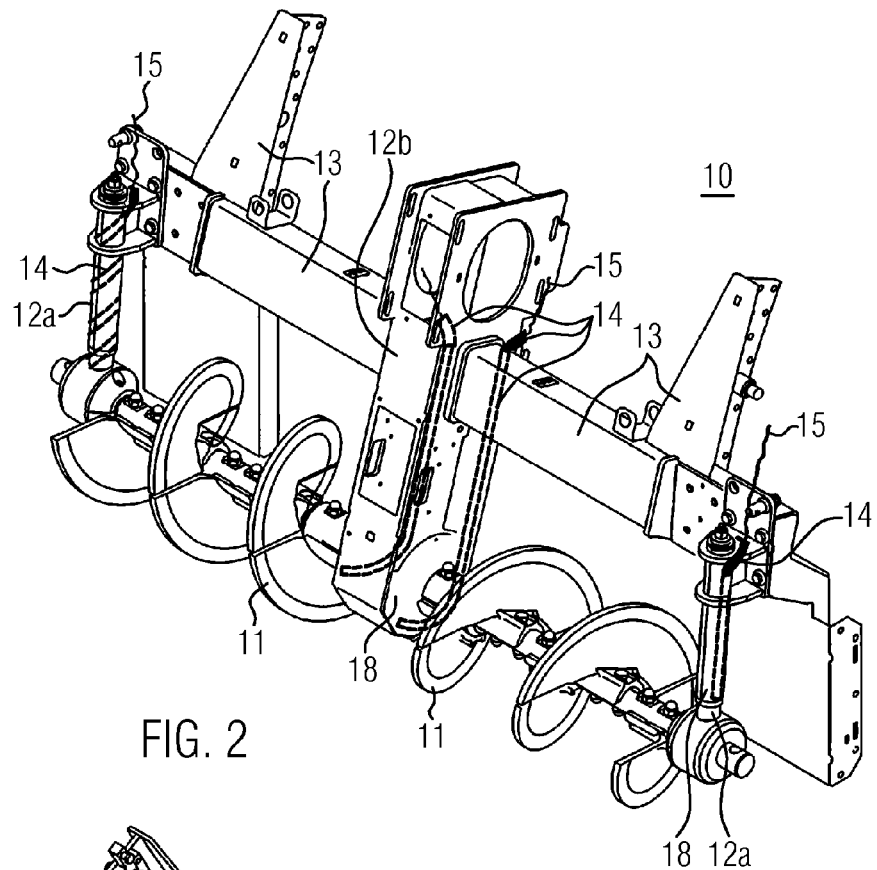
FIG. 2 shows a perspective rear view of an enlarged perspective illustration of a conveyor system of the construction machine of FIG. 1, i.e., with a view to the rear side of the construction machine.

FIG. 2 shows an enlarged view of the conveyor system 10. It shows the bearing structures 12 which are connected to the machine frame 2 by the structural elements 13. In the embodiment shown four heating elements 14 are provided, one thereof respectively in the outer bearing pedestals 12a and two in the central bearing pedestal 12b. In this embodiment the heating elements 14 are provided inside the bearing structures 12. Thus, they are protected from outer influences, such as dirt, moisture, impacts and strokes as well as temperatures that are too high or too low. The schematic form of illustration with dashed lines is to demonstrate that the heating elements 14 are provided inside the bearing structures 12. This may be realized in different ways. The heating elements 14 may be integrated in the wall members of the bearing structures 12, or they may be provided in a hollow space 18 inside the bearing structures 12.

As is shown, different forms of arrangement are possible. For example, in the right outer bearing pedestal 12a of FIG. 2 the heating element 14 is arranged linearly. In the left outer bearing pedestal 12a of FIG. 2 the heating element 14 is arranged in a helical shape. In the center bearing pedestal 12b the heating elements 14 are initially arranged linearly, and arc-shaped at one end, so that the shape resembles the Latin letter J. However, any other suitable forms are conceivable, too. In the illustrated embodiment, the heating elements 14 are operable with electric energy, and are illustrated with indicated connecting leads 15. However, other types of heating elements may be provided just as well, e.g., the aforementioned gas burners or liquid burners, or hot air blowers which can be operated, for example, with the heated cooling air of the primary drive 5 or exhaust gases thereof. These variation possibilities also apply to the exemplary embodiments described below, in which the arrangement of the heating elements 14 is altered.

Figure 3:
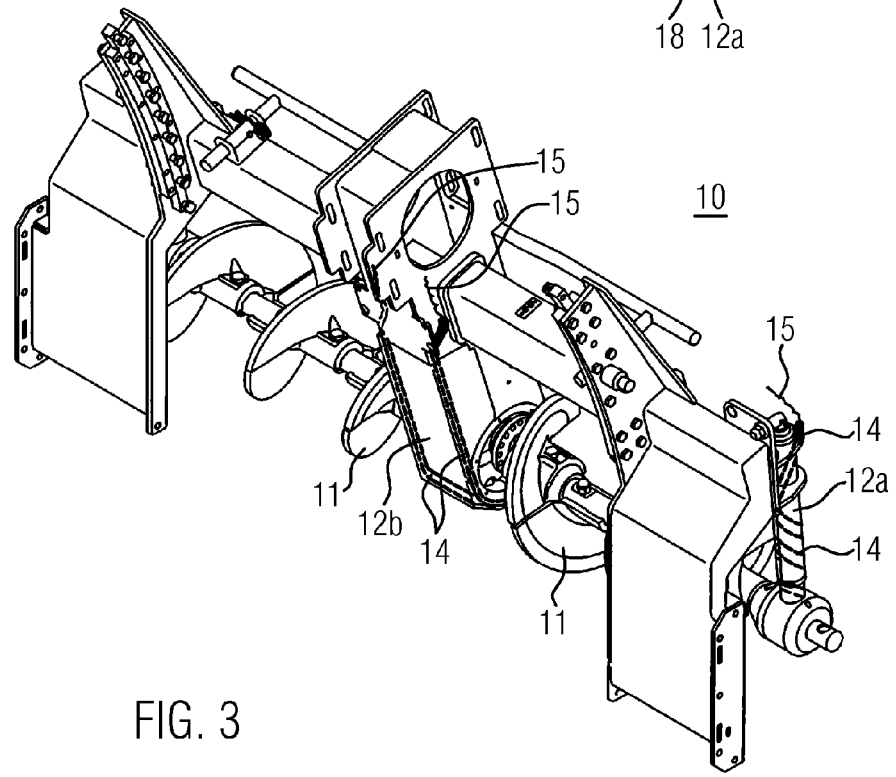
FIG. 3 shows a perspective view of the conveyor system of FIG. 2 from the opposite side, i.e., in the viewing direction opposite to the driving direction of the construction machine.

FIG. 3 initially shows a view of the conveyor system 10 from the opposite direction of FIG. 2. The configuration of the conveyor system 10 with the screw conveyors 11, the bearing structures 12 and the heating elements 14 provided in the bearing structures 12 has not been changed there.

Figure 4:
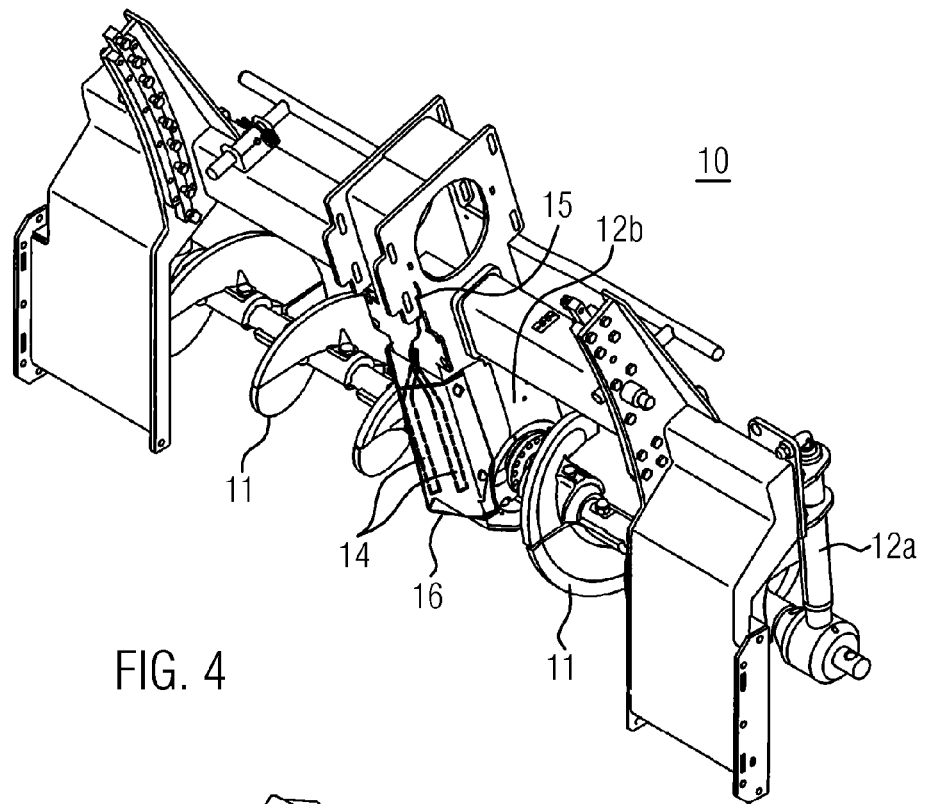
FIG. 4 shows the same view of a material conveyor system as FIG. 3, however, the heating elements shown are illustrated in accordance with another exemplary embodiment.

FIG. 4 shows a second embodiment of the arrangement of the heating elements 14 on the center bearing pedestal 12b. The heating elements 14 are, in this embodiment, arranged on the outside of the center bearing pedestal 12b. The arrangement on the outside can imply that the heating elements 14 are integrated in the wall of the center bearing pedestal 12, but are exposed to the outside. It may just as well imply that the heating elements 14 are provided on an outer surface of the center bearing pedestal 12b, for example, using a removable or a permanent connection. In the embodiment shown in FIG. 4 a protective element 16 is provided. This has the advantage that the heating elements 14 exposed to the outside or provided on the outside of the center bearing pedestal 12b, respectively, are protected at least from mechanical influences, such as impacts and strokes. Also, an adhesion by the paving material 9 is prevented by this protective element 16. Depending on the design of the protective element 16 the heating elements 14 may also be protected from moisture and dust, e.g., by seals. In the embodiment shown in FIG. 4 the protective element 16 is fixed to the center bearing pedestal 12b itself by detachable screw connections. Also, it is possible to use a permanent connection, e.g., a welded or adhesive connection. It is also possible, however, to fix the protective element 16 to other suitable structures of the road finisher by means of detachable or permanent connections.

Figure 5:
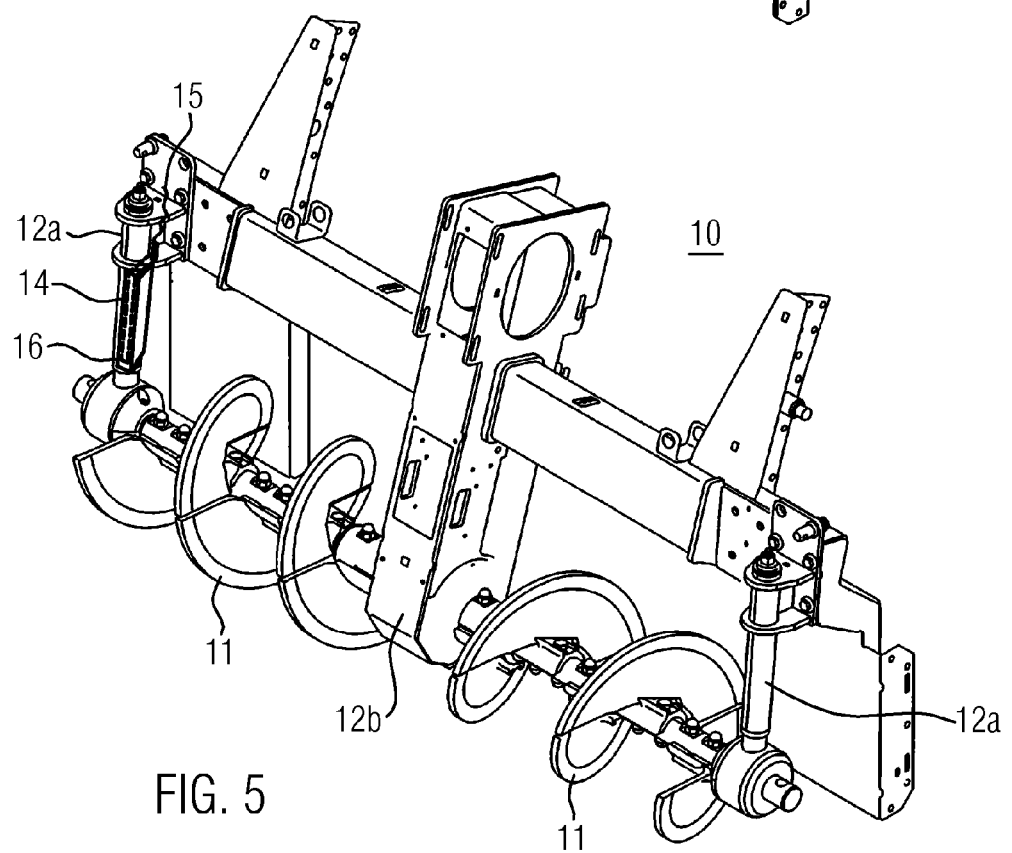
FIG. 5 shows the same view of a material conveyor system as FIG. 2, however, the heating element shown is illustrated in accordance with a third exemplary embodiment.

FIG. 5 show an embodiment similar to the embodiment of FIG. 4. The viewing direction is opposite to that of FIG. 4. In this case, the heating element 14 is mounted on an outside of one of the outer bearing pedestals 12a. Like the heating elements on the outside of the center bearing pedestal 12b in FIG. 4, the heating elements 14 of this embodiment, too, can be integrated in the outer wall of the outer bearing pedestal 12a or, alternatively, be fixed by a detachable or permanent connection to the outer wall of the outer bearing pedestal 12a. The heating element 14 of the embodiment illustrated in FIG. 5 is also protected by a protective element 16. The functionality and the variation possibilities correspond to those of the protective element 16 shown in the embodiment according to FIG. 4.

Figure 6:
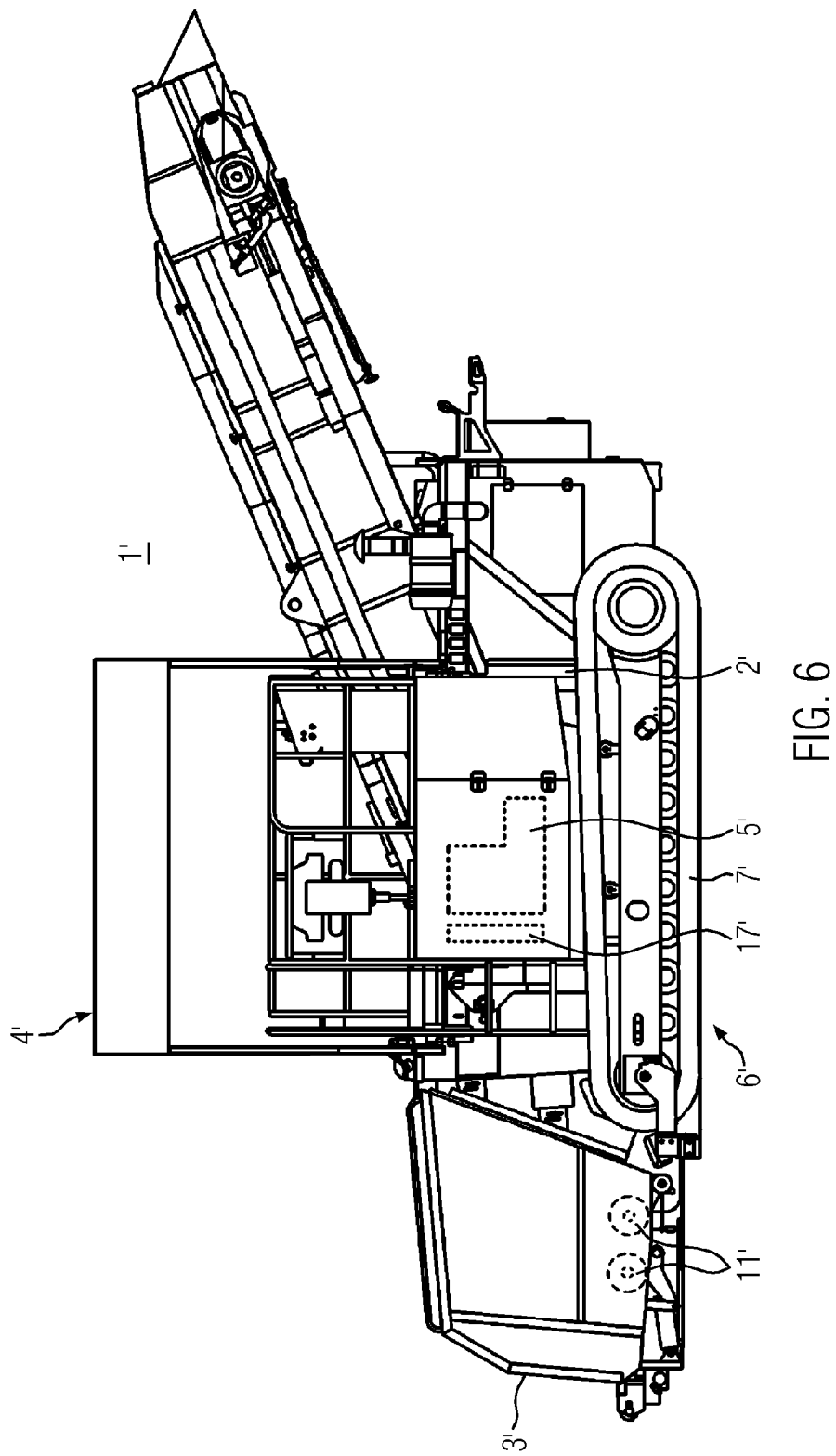
FIG. 6 shows a lateral view of a construction machine, in this example, a feeder, wherein components hidden in this view behind other parts are shown in dashed lines.

FIG. 6 shows another construction machine according to the disclosure, in this case a feeder 1' in a lateral view. The feeder 1' comprises a machine frame 2' on which a material bunker 3', an operator's platform 4', a primary drive 5' as well as an undercarriage 6' with propulsion elements 7' are provided. The primary drive 5' is provided at least for driving the undercarriage 6'. Like in the first-mentioned embodiment, the primary drive 5' may provide for a suitable form of energy for other aggregates of the feeder 1', e.g., hydraulic pressure for hydraulically driven systems or electric voltage for electrically operated systems.

The material bunker 3' serves to receive a stock of material 9' from which the subsequent pavement is made. To this end, the material 9' is conveyed through a longitudinal conveying system 19, past the operator's platform 4' into a material bunker 3 of a following road finisher behind, e.g., the road finisher 1 according to the first-mentioned embodiment. Four screw conveyors 11' are arranged in the material bunker 3'. In this embodiment, they serve to convey the material 9' from edge regions of the bunker 3' in the direction of the longitudinal conveying system 19.

The screw conveyors 11' need not be provided in the bunker 3'. Rather, it is conceivable that screw conveyors 11' are provided at any position of the feeder 1', e.g., as part of the longitudinal conveying system 19, or as screw conveyors 11' that are specifically provided for the better mixing of the material 9' and are arranged, for example, between the material bunker 3' and the longitudinal conveying system 19. A material bunker 3' without any screw conveyors 11' is conceivable, too.

The screw conveyors 11' are rotatably mounted to the feeder 1' by bearing structures 12'. In the embodiment shown the bearing structures 12' are each connected to respective walls of the bunker 3'. They may also be directly fixed to the machine frame 2' or to other structural elements of the feeder 1'.

Figure 7:
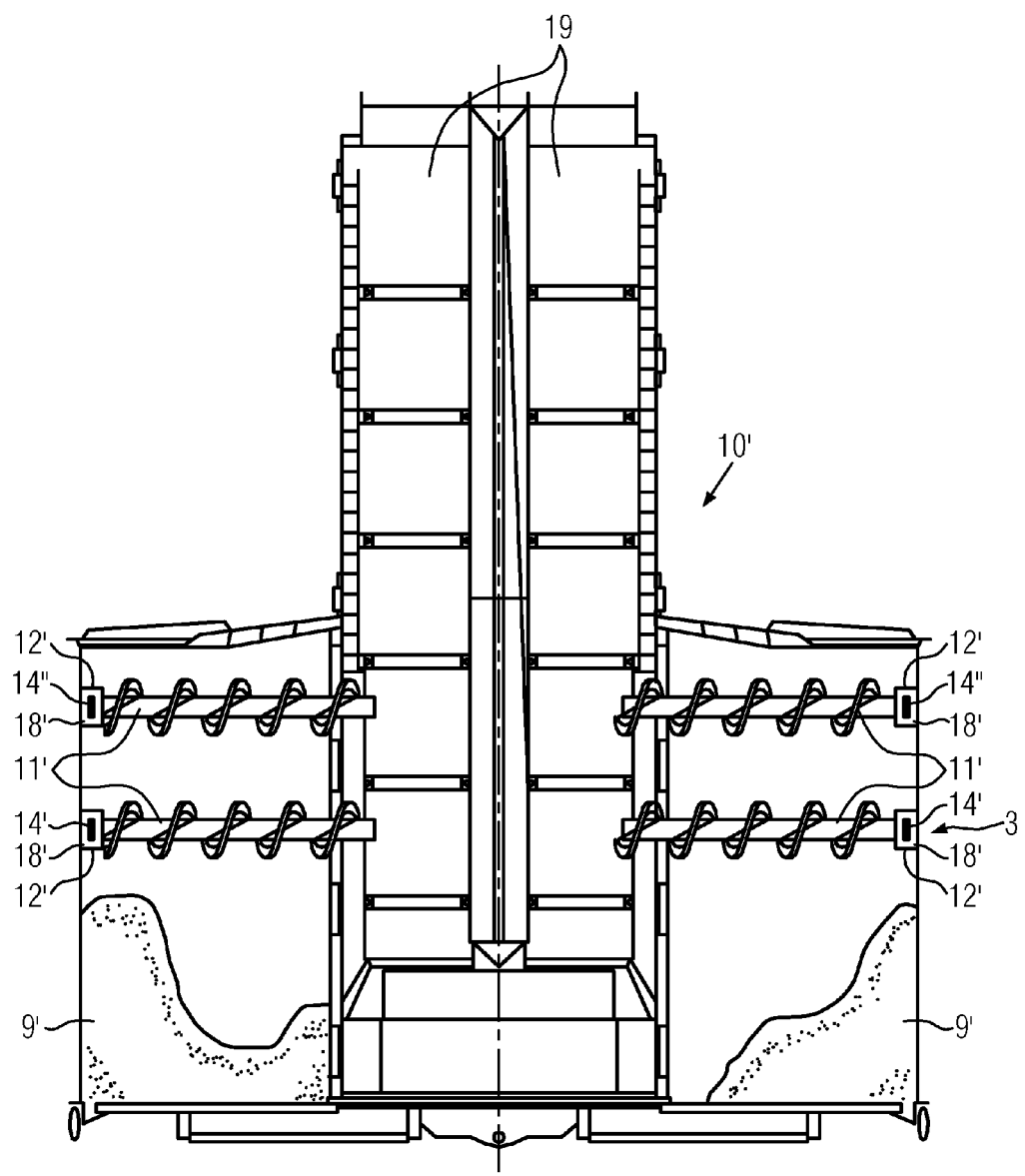
FIG. 7 shows a top view of the feeder of FIG. 6, wherein, for the sake of clearness, the operator's platform, the undercarriage and the machine frame are not shown in this view, and the heating elements are illustrated in accordance with another exemplary embodiment of the disclosure.

FIG. 7 shows a conveyor system 10' of the feeder 1' with the screw conveyors 11'. In the embodiment shown in FIG. 7 heating elements 14', 14" are arranged inside a hollow space 18' of the bearing structures 12'. In this embodiment the heating elements are configured, for example, as fuel-operated heating elements 14' and/or as hot air blowers 14", and are illustrated schematically. These operating modes of the heating elements are also conceivable, however, in combination with the above-described exemplary embodiments in which the construction machine 1 is a road finisher. Both the bearing structures 12' and the heating elements 14', 14" are merely shown schematically. The heating elements 14', 14" may be mounted either in the interior of the bearing structure 12' or, alternatively, integrated into the bearing structure 12'. This means that they may be constructed integrally, in one piece with the bearing structure 12'.

Figure 8:
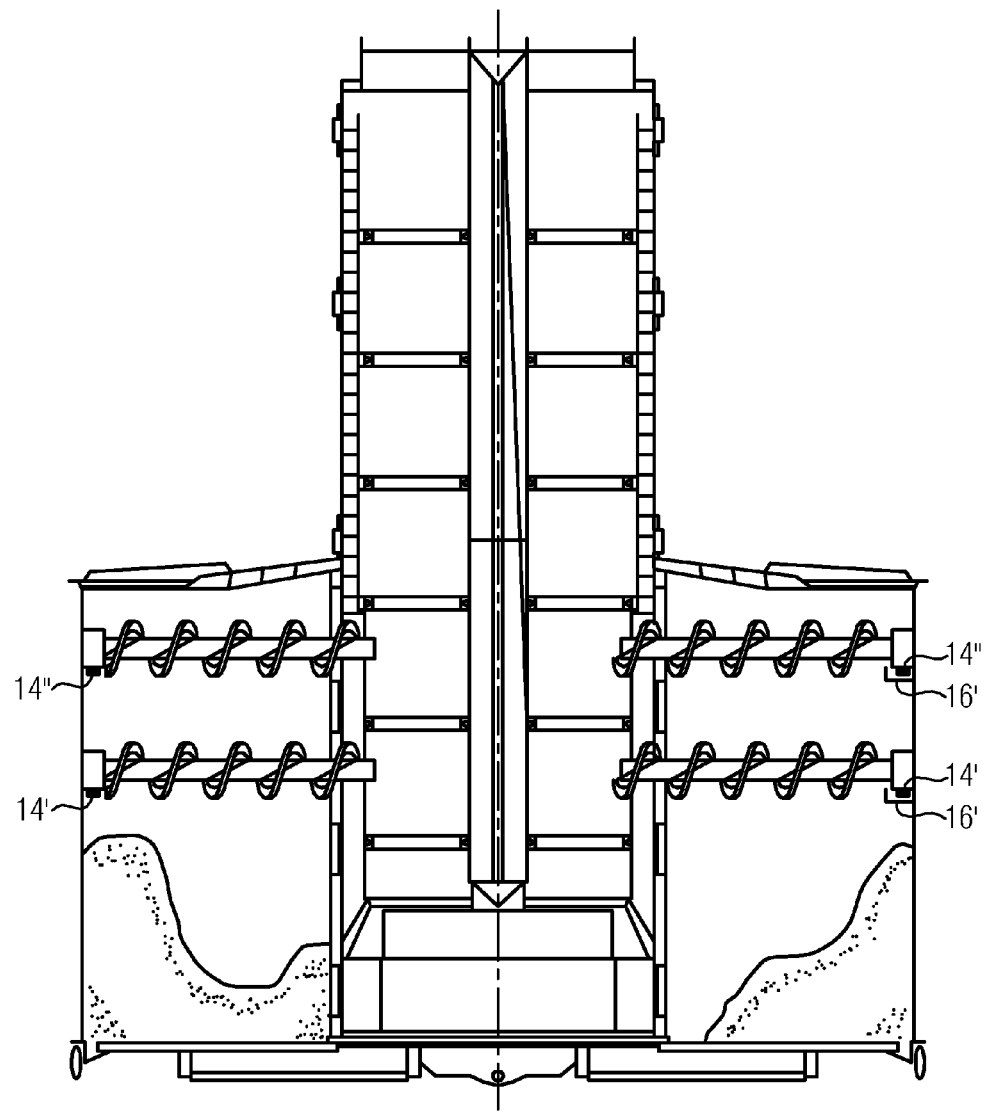
FIG. 8 shows the same view as FIG. 7, but with heating elements according to another exemplary embodiment of the disclosure, wherein, for the sake of clearness, only those components are provided with reference numbers that differ from those in FIG. 7.

FIG. 8 shows the view of FIG. 7 according to another exemplary embodiment of the disclosure. In FIG. 8 merely those components are designated with reference numbers whose configuration has changed in comparison with the embodiment shown in FIG. 7. This pertains in particular to the heating elements 14', 14" which are now provided on an outside of the bearing structures 12'. On the right side of FIG. 8 the heating elements 14', 14" are additionally protected by protective elements 16'. The protective elements 16' are, in this case, attached to the wall of the bunker 3'. They may also be fixed to any suitable parts of the feeder 1'.

The possible variations described in the embodiments that show a road finisher 1 apply correspondingly to the embodiments showing the feeder 1'. The operating modes and energy sources mentioned in connection with the embodiment of the road finisher 1, too, can be applied to the heating elements 14', 14" of the feeder 1'.

The embodiments shown may merely represent a choice of the possible combinations. It is possible to provide any number of heating elements 14, 14', 14" on any number of bearing structures 12, 12'. It is not necessary to provide a heating element on all of the provided bearing structures 12, 12'. If a bearing structure 12, 12' is to be heated, this may be accomplished by an optional number of heating elements 14, 14', 14". The design of the heating elements 14, 14', 14", too, can be combined optionally. It is possible, for example, to insert helical-shaped heating elements 14, 14', 14" in one or more bearing structures of a conveyor system 10, 10', and linear heating elements 14, 14', 14" in other bearing structures 12, 12' of the same conveyor system 10, 10'. Also, it is possible to combine bearing structures 12, 12' having integrated heating elements 14, 14', 14" and bearing structures 12, 12' having non-integrated heating elements 14, 14', 14" and/or combine heating elements 14, 14', 14" provided in the interior of the bearing structures 12, 12' or heating elements 14, 14', 14" exposed to the inside, respectively, with heating elements 14, 14', 14" provided on an outside of another bearing structure 12, 12 or heating elements 14, 14', 14" exposed to the outside, respectively. Moreover, providing or not providing protective elements 16, 16' on several bearing structures 12, 12' as well as the fixing type and/or fixing location thereof may be combined as desired. It is possible, for example, that a conveyor system 10 having two outer bearing pedestals 12a and one center bearing pedestal 12b does not have a protective element 16 on the heating element provided on the center bearing pedestal 12b, but a removably fixed protective element 16 on one of the outer bearing pedestals 12a and a permanently fixed protective element 16 on the other outer bearing pedestal 12a.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A construction machine for the processing and/or transport of material having a temperature-dependent viscosity, the construction machine being a road finisher or a feeder and comprising:
a machine frame on which a material bunker, an operator's platform, a primary drive and an undercarriage with propulsion elements are provided; and
a conveyor system which is configured to convey the material, wherein the conveyor system comprises a screw conveyor that is rotatable about a rotation axis, a bearing structure that supports the screw conveyor around the rotation axis, and a heating element configured to heat the bearing structure, wherein the bearing structure comprises a bearing pedestal that extends in a direction transverse to the rotation axis, and wherein the heating element is arranged inside the bearing pedestal or is provided on an outside of the bearing pedestal.

2. The construction machine according to claim 1 wherein the heating element is integrated into the bearing structure.

3. The construction machine according to claim 2 further comprising a protective element for protecting the heating element, the protective element being fixed to the bearing structure.

4. The construction machine according to claim 1 wherein the heating element is arranged in a hollow space present inside the bearing pedestal.

5. The construction machine according to claim 1 wherein the conveyor system further comprises a protective element for protecting the heating element, the protective element being fixed to the bearing structure.

6. The construction machine according to claim 5 wherein the protective element is removably fixed to the bearing structure.

7. The construction machine according to claim 1 wherein the bearing pedestal comprises a central bearing pedestal or an outer bearing pedestal.

8. The construction machine according to claim 1 wherein the conveyor system comprises a plurality of the bearing structures and a plurality of the heating elements, such that each bearing structure is provided with at least one heating element, wherein each heating element is arranged inside the bearing structure at which it is provided or is arranged on an outside of the bearing structure at which it is provided.

9. The construction machine according to claim 8 wherein all of the heating elements are arranged inside the respective bearing structures, or all of the heating elements are arranged outside of the respective bearing structures.

10. The construction machine according to claim 1 wherein heating capacity of the heating element is variably adjustable.

11. The construction machine according to claim 1 wherein heating capacity of the heating element is automatically controllable.

12. The construction machine according to claim 11 wherein heating capacity of the heating element is automatically controllable based on a predefined desired temperature value.

13. The construction machine according to claim 1 wherein the heating element can be operated independently of other components of the construction machine.

14. The construction machine according to claim 1 wherein the heating element can be operated using electric energy.

15. The construction machine according to claim 14 wherein the heating element comprises a resistance heating element, an inductive heating element or an infrared radiator.

16. The construction machine according to claim 1 wherein the heating element can be operated by combustion of a fuel.

17. The construction machine according to claim 16 wherein the fuel is a fuel for operating the primary drive.

18. The construction machine according to claim 1 wherein the heating element comprises a hot air blower which can be operated by heated cooling air of a cooling system of the primary drive or exhaust gases of the primary drive.

19. The construction machine according to claim 1 wherein the heating element is arranged linearly in a direction generally transverse to the rotation axis.

20. The construction machine according to claim 1 wherein the heating element is arrange in a helical shape.

21. The construction machine according to claim 1 wherein the heating element is integrated into a wall member of the bearing pedestal.

22. A construction machine for processing and/or transporting material having a temperature-dependent viscosity, the construction machine being a road finisher or a feeder and comprising:
a machine flame; and
a conveyor system configured to convey the material, wherein the conveyor system comprises a screw conveyor that is rotatable about a rotation axis, a bearing structure attached to the machine frame and supporting the screw conveyor around the rotation axis, and a heating element configured to heat the bearing structure, wherein the bearing structure comprises a bearing pedestal that extends in a direction transverse to the rotation axis, and wherein the heating element is arranged inside the bearing pedestal or is provided on an outside of the bearing pedestal.

* * * * *

UNITED STATES PATENT AND TRADEMARK OFFICE
CERTIFICATE OF CORRECTION

PATENT NO.       : 9,340,365 B2
APPLICATION NO.  : 14/265803
DATED            : May 17, 2016
INVENTOR(S)      : Bernhard Erdtmann et al.

It is certified that error appears in the above-identified patent and that said Letters Patent is hereby corrected as shown below:

In the claims

Column 10, Line 21, Claim 20:

After "element is"
Delete "arrange" and
Insert -- arranged --.

Signed and Sealed this
Twenty-third Day of August, 2016

Michelle K. Lee
*Director of the United States Patent and Trademark Office*